(12) United States Patent
Rosenberger et al.

(10) Patent No.: US 12,010,377 B2
(45) Date of Patent: Jun. 11, 2024

(54) SYSTEM AND METHOD FOR ADAPTIVE STORAGE OF VIDEO DATA

(71) Applicant: ARRIS ENTERPRISES LLC, Suwanee, GA (US)

(72) Inventors: Aniela M. Rosenberger, Norristown, PA (US); William P. Franks, San Diego, CA (US); Kaliraj Kalaichelvan, San Diego, CA (US); Arpan Kumar Kaushal, San Diego, CA (US); Rajesh K. Rao, San Marcos, CA (US); Ernest George Schmitt, Maple Glen, PA (US)

(73) Assignee: ARRIS Enterprises LLC, Horsham, PA (US)

( * ) Notice: Subject to any disclaimer, the term of this patent is extended or adjusted under 35 U.S.C. 154(b) by 186 days.

(21) Appl. No.: 17/667,204

(22) Filed: Feb. 8, 2022

(65) Prior Publication Data
US 2022/0321947 A1    Oct. 6, 2022

Related U.S. Application Data

(60) Provisional application No. 63/170,732, filed on Apr. 5, 2021.

(51) Int. Cl.
*H04N 21/433* (2011.01)
*H04N 21/438* (2011.01)
*H04N 21/462* (2011.01)

(52) U.S. Cl.
CPC ..... *H04N 21/4331* (2013.01); *H04N 21/4334* (2013.01); *H04N 21/4381* (2013.01); *H04N 21/4622* (2013.01)

(58) Field of Classification Search
None
See application file for complete search history.

(56) References Cited

U.S. PATENT DOCUMENTS

| 10,771,527 | B2  | 9/2020  | Basile |           |
|------------|-----|---------|--------|-----------|
| 2012/0124294 | A1 | 5/2012 | Atkisson et al. | |
| 2012/0131622 | A1 | 5/2012 | McDysan et al. | |
| 2013/0308919 | A1* | 11/2013 | Shaw | H04N 21/6473 386/E9.011 |
| 2014/0053225 | A1* | 2/2014 | Shoykher | H04N 21/8173 725/132 |
| 2014/0270697 | A1* | 9/2014 | Verheem | H04N 21/4334 386/326 |
| 2016/0191997 | A1* | 6/2016 | Eklund | H04N 21/4314 725/59 |
| 2021/0176528 | A1* | 6/2021 | Kalaichelvan | H04N 21/4622 |
| 2022/0321947 | A1* | 10/2022 | Rosenberger | H04N 21/4622 |

OTHER PUBLICATIONS

International Search Report and Written Opinion for Application No. PCT/US2022/015661 dated May 3, 2022 (7 pages).

* cited by examiner

*Primary Examiner* — Kim T Nguyen
(74) *Attorney, Agent, or Firm* — Panitch Schwarze Belisario & Nadel LLC

(57) ABSTRACT

A system and method dynamically supporting the concurrent storage of both quadrature amplitude modulated formatted and Internet protocol formatted video content. In particular, this dynamic support is based, at least in part, upon the recognition of format of the content being stored or retrieved from a memory. This memory is typically a hard-disk drive associated with a media gateway appliance. The system and method enable the provision of an improved content viewing and storage experience for users.

20 Claims, 3 Drawing Sheets

SYSTEM AND METHOD FOR ADAPTIVE STORAGE OF VIDEO DATA

CROSS-REFERENCE TO RELATED APPLICATION

This application claims the benefit of U.S. Provisional Patent Application No. 63/170,732, filed Apr. 5, 2021, which is incorporated by reference herein in its entirety.

BACKGROUND OF THE INVENTION

Typically, high-definition television ("HDTV") content is transmitted utilizing quadrature amplitude modulation ("QAM") in accordance with International Telecommunication Union ("ITU") Recommendation J.83 entitled "Digital multi-programme systems for television, sound and data services for cable distribution". This type of modulation is widely employed for video content that is delivered via cable, fiber, or satellite, as well as content provided via terrestrial digital broadcast channels. The QAM content is then demodulated by an HDTV tuner for viewing upon an appropriate monitor, device or television.

An alternate means of providing HDTV content utilizes a packetized transmission scheme in accordance with Internet Protocol ("IP") standards promulgated by the Internet Engineering Task Force ("IETF"). This type of video content delivery is referred to as IPTV and does not involve QAM. IPTV content delivery is often utilized by Internet content providers to streaming video.

With the increased availability of residential broadband delivery of digital video content and the ever-growing number and variety of digital video content sources, consumers are storing more content than ever upon digital video recorders ("DVRs"). These devices, often integrated into set-top boxes, offer consumers a convenient means of capturing one or more live streams of digital content for later and/or repeated viewing. Incoming QAM modulated video content is stored within DVR memory, typically a hard-disk drive ("HDD"). When the content is retrieved from the DVR memory, an HDTV tuner is employed to demodulate the stored content for viewing.

Unfortunately, present DVR technology does not provide a means for conveniently and concurrently storing both QAM formatted and IPTV formatted content. The overwhelming majority of residential DVRs are dedicated to recording and retrieving QAM video content. DVRs capable of recording IPTV content are typically associated with security or video surveillance systems and are wholly incompatible with most, if not all, residential HDTV networks, be they broadcast, cable, fiber or satellite based.

Given the expanding use of IPTV providers, in both established and emerging HDTV markets, there exists a need for a system and method supporting an adaptive system for the recording and retrieval of both QAM video and IPTV content. Ideally, the storage and retrieval would be accomplished in a manner that was transparent to a user, with the DVR automatically recognizing the type of video content (QAM vs. IPTV) being stored and/or retrieved. To provide such transparency, a DVR would need to be capable of recognizing the type of content to be stored or retrieved (QAM or the IPTV format), and provided appropriate buffering to support so as to support the proper storage of content and/or the uninterrupted viewing of the content.

BRIEF SUMMARY OF THE INVENTION

A system and method dynamically supporting the concurrent storage of both QAM formatted and IPTV formatted video content. In particular, this dynamic support is based, at least in part, upon the recognition of format of the content being stored or retrieved from a memory. This memory is typically an HDD associated with a media gateway appliance ("MGA). The system and method enable the provision of an improved content viewing and storage experience for users.

BRIEF DESCRIPTION OF THE DRAWINGS

The aspects, and advantages of the present invention will become better understood with regard to the following description, appended claims, and accompanying drawings in which:

DETAILED DESCRIPTION

Figure 1:
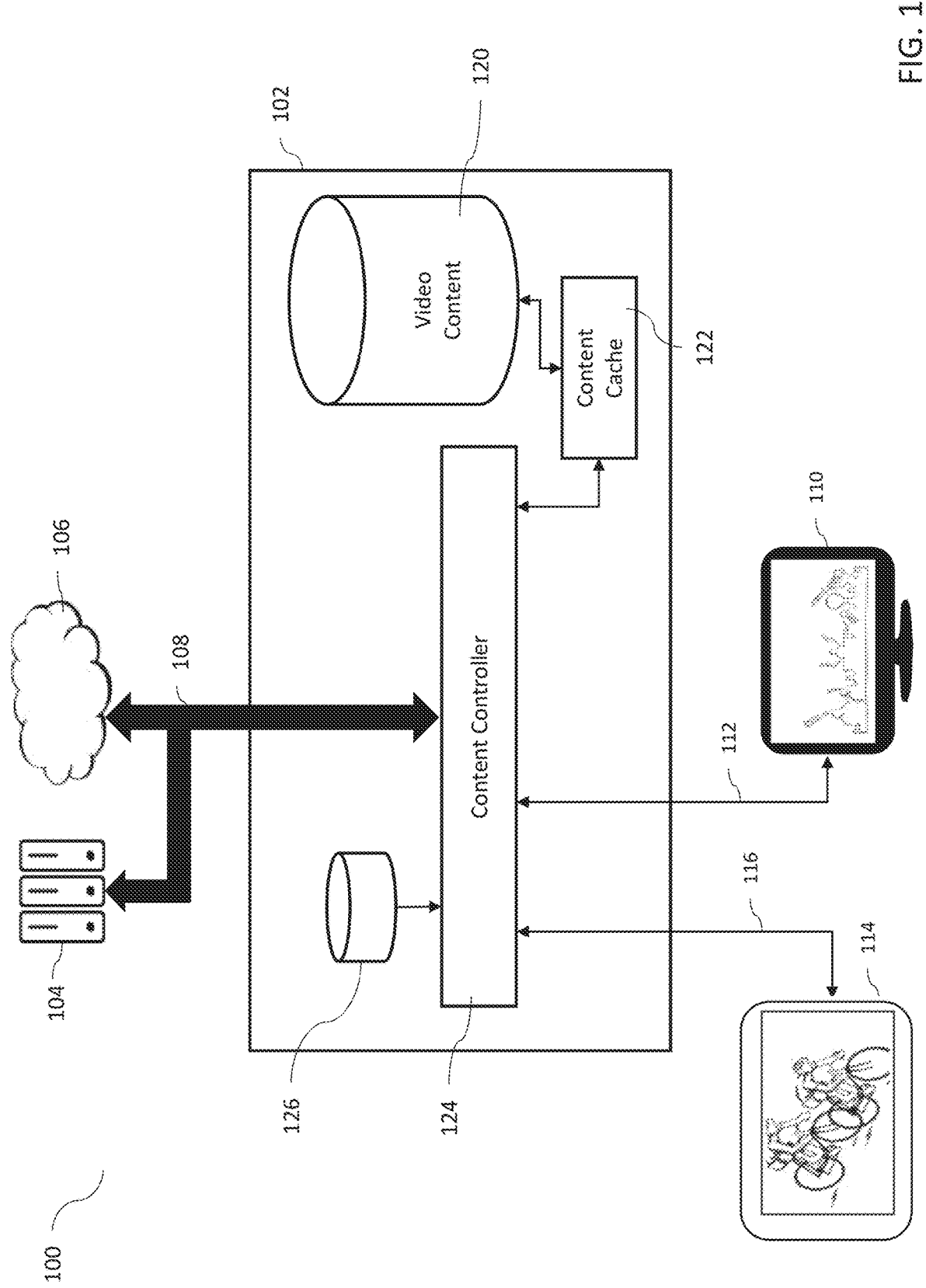
FIG. 1 is a functional block diagram of a system supporting the dynamic adjustment incoming and outgoing content from a content storage memory based, at least in part, upon the recognition of content format.

FIG. 1 provides a functional block diagram of system 100 which selective recognition of video content for storage and retrieval. As shown, the system includes MGA 102 which is linked to a multi-service operator ("MSO") headend 104 and an Internet-based content provider (106) via broadband network 108. Broadband network 108 can be a wired or wireless network capable of supporting broadband, bidirectional communications with MGA 102. Both headend 104 and Internet content provider 106 are adapted for the provision of video content to MGA 102 via broadband network 108. This video content provided by either of the two sources can be in both QAM and IP format. MGA 102 is also shown to be linked to digital television ("DTV") 110 via interface 112, and to tablet 114 via interface 116. Interfaces 112 and 116 can be each be supported by a wired connection, such as a coaxial cable or high-definition media interface ("HDMI") link, or by a wireless connection, such as a local wireless network (Wi-Fi, 802.11, etc.).

MGA 102 is adapted to provide DVR functionality and shown to include controller 124 and content memory 120. The ARC Processor xxx can comprise one or more processors. Content memory 120 could be a hard disk drive ("HDD"), a solid-state drive ("SSD"), or any other type of digital storage media having a sufficient capacity for the storage of digital video content data, including cloud-based storage. The storage to content memory 120 must be facilitated so as support the rate (or rates) and types of content being received via broadband network 108, as well as the data rate(s) required for the provision of content to client devices (DTV 110 and tablet 114).

MGA 102 is also shown to include content cache 122, which is a defined region of random-access memory ("RAM") (either an entire discrete memory device or a designated portion of such a device) that serves as a buffer for video data as it is transferred to and from content memory 120. In addition, MGA 102 is shown to include content controller 124 and instruction/parameter memory 126. Content controller 124 is comprised of one or more processors. Memory 126 contains instructions and operational parameters for utilization by content controller 124.

These stored instructions and parameters enable content controller 124 to discriminate between various types of video content entering, exiting, or being stored within MGA 102, and process them as a function of content type and/or predefined user or provider (MSO, Internet-based content provider) preferences.

Utilizing the information stored within instruction/parameter memory 126, content controller makes a determination as to the type of video (QAM or IPTV) that is being received via broadband network. In making such a determination the content controller 124 may parse information included in a data header associated with the incoming content, base the determination in whole or in part upon the particular provider sourcing the content, and/or by recognizing a content format based upon the content data itself. Recognition of such content characteristics is well-known in the art and the particular instructions and operations supporting such will not be discussed in detail here. The information stored within instruction/parameter memory 126 supporting this recognition, and the subsequent storage and retrieval of recognized content to/from content memory 120, includes one or more of the following:

QAM format recognition parameters;
IPTV format recognition parameters;
Content memory storage rate characteristics;
Content memory retrieval rate characteristics; and
Client device content download rates.

If the recognized content incoming from broadband network 108 is intended for storage within content memory 120, content controller 124, in accordance with the information stored in instruction/parameter memory 126, utilizes content cache 122 to serve as an adaptive buffer. Content controller 124 mediates the rate of data flowing into content cache 122, as well as the rate at which data is written from content cache 122 to content memory 120. This rate is adjusted so that the demands placed upon content memory 120 do not exceed the present capabilities of that memory. As with any memory, the given capabilities to retrieve and store data will vary based upon the overall loading of the memory. Overall loading being a function of the rate and number of read and write operations being performed.

The adjusted rate must also be a function of content cache availability. Content cache 122 provides content controller with information indicative of the availability of buffer space within the content cache, including the depth of the content cache. Depth being a measure of the ability of a given cache to accept incoming data over a given period of time going forward. The depth may be calculated based upon the rate of incoming data to the cache versus outgoing data, the scheduled inception or termination of any incoming or outgoing content streams to/from the cache, as well as peak and sustainable read and write rates to and from the cache.

Figure 2:
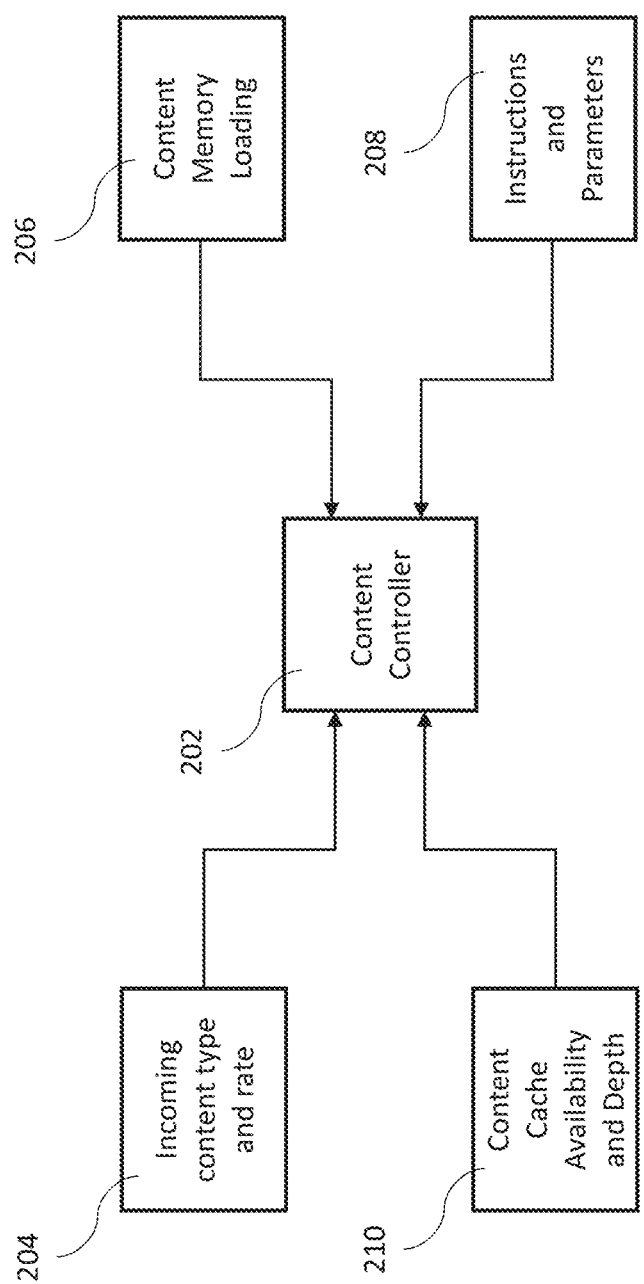
FIG. 2 is a block diagram depicting information provided to the content controller within the system of FIG. 1.

FIG. 2 provides a block diagram of information monitored by or provided to the content controller (124, 202) so as to enable the aforementioned mentioned content storage and retrieval. As shown, the content controller receives data indicative of both the type and rate of incoming content (204). This data is obtained from a data header, analysis of the data's format, or from the provider of the incoming content. Information indicative of the present loading upon content memory 120 (206) and the instructions/parameters (208) from memory 126 are also provided to the content controller. In addition, data indicative of the availability and depth of the content cache (210) is shown to be provided to content controller 124.

Figure 3:
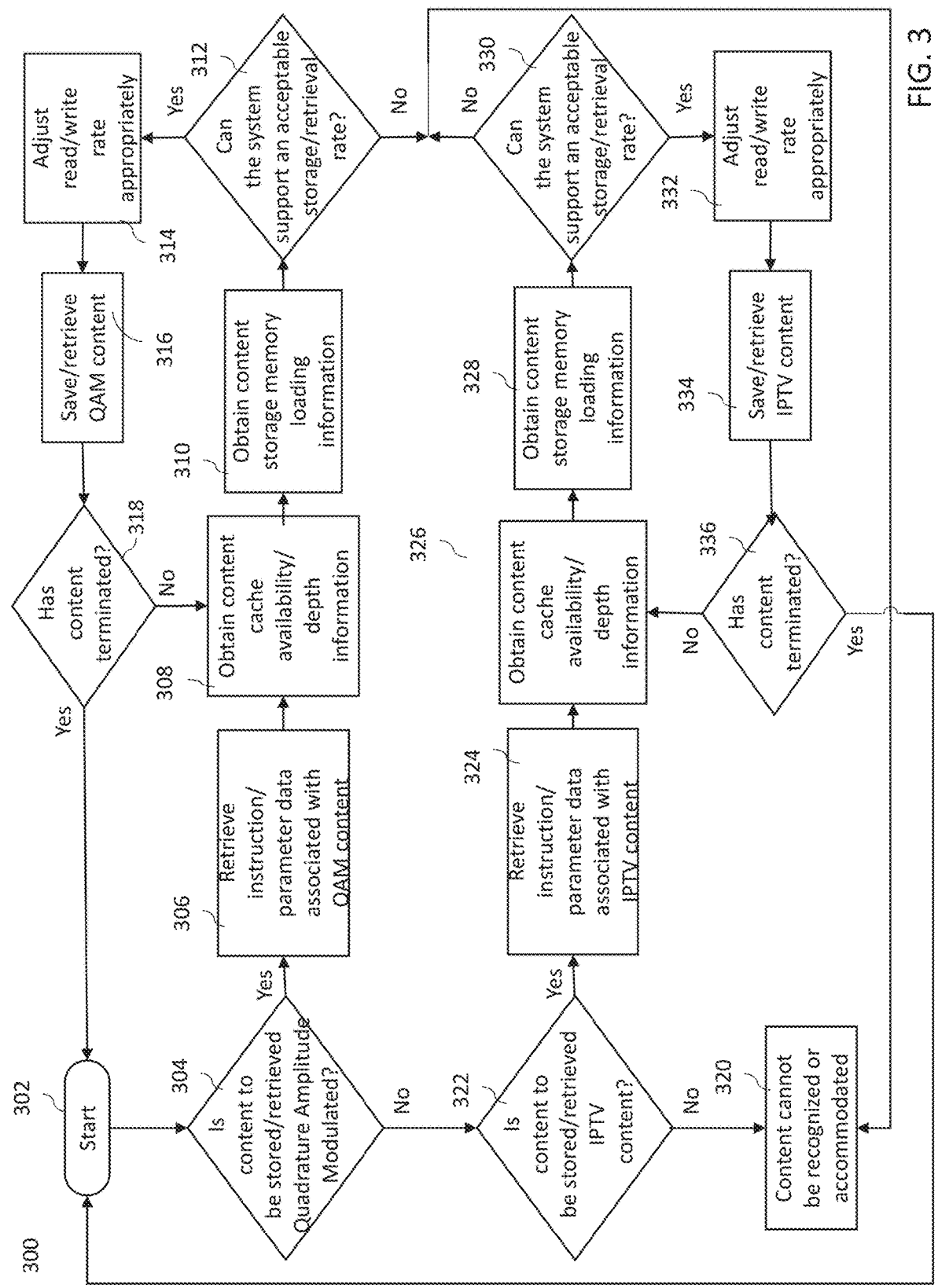
FIG. 3 is a flow diagram of a process supported by the system of FIG. 1 for the dynamic adjustment incoming and outgoing content from a content storage memory based, at least in part, upon the recognition of content format.

FIG. 3 provides a flow diagram of a preferred process (300) supporting the content storage and retrieval as a function of content recognition. The process initiates at step 302 and proceeds to step 304 where it tests whether the content of interest is QAM data. If the content is QAM data, the process continues with step 306 and data associated with QAM content is retrieved from the content and parameter memory. Next, in step 308, information of the availability and depth of the content cache is obtained. The process continues with step 310 where information as to the loading of storage memory is obtained. The content controller then determines if content memory and the content cache can support the storage/retrieval of the content of interest (step 312). If the determination at step 312 results in an affirmative outcome, the read/write rate is adjusted accordingly (step 314) and the content is saved or retrieved (step 316). At step 318 the process determines of the content has terminated. If so, the process reverts back to start (302). If not, the process continues with step 308 and the obtaining of updated cache information.

Referring back to step 312, if the determination is made that the system cannot adequately support the storage/retrieval of the content of interest, the process continues with step 320. Step 320 is recognition that the content cannot be accommodated by the system. This could simply result in termination and reinitiation of the process (step 302), of the system could be adapted to generate a message indicative of the failure. This message could be shared with a user of the system (via a user interface) and/or sent to the content provider via broadband network 108.

If the process at step 304 determined that the content of interest was not QAM data, the process would continue with step 322, wherein the determination is made as to whether the content is IPTV data. If the content is IPTV data, the process continues with step 324 and data associated with IPTV content is retrieved from the content and parameter memory. Next, in step 326, information of the availability and depth of the content cache is obtained. The process continues with step 328 where information as to the loading of storage memory is obtained. The content controller then determines if content memory and the content cache can support the storage/retrieval of the content of interest (step 330). If the determination at step 330 results in an affirmative outcome, the read/write rate is adjusted accordingly (step 332) and the content is saved or retrieved (step 334). At step 336 the process determines of the content has terminated. If so, the process reverts back to start (302). If not, the process continues with step 326 and the obtaining of updated cache information. If at step 330, it is determined that the system cannot adequately support the storage/retrieval of the content of interest, the process continues with step 320.

Although the embodiment discussed above focuses upon a single QAM or IPTV content stream being buffered and stored/retrieved, it will be understood that it is typical for a DVR to store and retrieve multiple content data streams simultaneously, and that such multiple data stream retrieval and storage is capable of being supported by system 100. The number of individual data streams being limited by the number of available sources, the speed and capacity of content controller 124, content cache 122 and content memory 120. If content memory is an HDD, the number of heads adapted to read from and write to the HDD will also be a factor that could limit the number of simultaneous data streams that the system could accommodate.

Although the invention herein has been described with reference to particular embodiments, it is to be understood that these embodiments are merely illustrative of the principles and applications of the present invention. Other embodiments and variations could be implemented without departing from the spirit and scope of the present invention as defined by the appended claims. In addition, it will be understood that the various connections depicted as wired in the above embodiments could also be supported by wireless connections without departing from the scope of the invention. The content controller functionality can be provided by a processor or processors local to or within an MGA, or by one or more remotely-located processors, linked via a network to an MGA. The memory supporting the storage of the video content can be a disk, a solid-state drive, cloud-based storage (in whole or in part), or any other means with sufficient capacity and speed to facilitate video storage and playback. The cache utilized in the above-described embodiments can also be local to or within an MGA, or be remotely-located and linked via a network to the MGA. Similarly, any number of various video-capable devices could serve as client devices. These include digital televisions, tablets, smart phones, computer monitors, etc.

The invention claimed is:

1. A system for the storage of streaming video content, comprising:
    at least one cache, having a first capacity and depth, and receiving (i) at least a first stream of content conforming to a first format and (ii) at least a second stream of content conforming to a second format;
    at least one first memory configured to store instructions and parameter data associated with the first format and the second format;
    at least one second memory configured to store video content; and
    a controller configured to dynamically adjust the rate at which content data is stored within the at least one second memory based, at least in part, upon one of the following parameters:
        the recognition of the stored content as conforming to the first format;
        the recognition of the stored content as conforming to the second format;
        the peak rate at which content can be written to the at least one cache;
        the sustained rate at which content can be written to the at least one cache;
        the peak rate at which content can be retrieved from the at least one cache;
        the sustained rate at which content can be retrieved from the at least one cache;
        the peak rate at which content can be stored in the at least one second memory;
        the sustained rate at which content can be stored in the at least one second memory; and
        the first capacity and depth.

2. The system of claim 1 wherein:
    the first format comprises quadrature amplitude modulated video data; and
    the second format comprises Internet protocol video data.

3. The system of claim 1 wherein the streaming video content is sourced from at least one of the following:
    an Internet-based content provider; and
    a multi-service provider.

4. The system of claim 1 wherein the at least one second memory comprises at least one of the following:
    a disc drive;
    a solid-state drive; and
    a cloud-based storage system.

5. The system of claim 1 wherein the stored instructions and parameter data comprises at least one of the following:
    quadrature amplitude modulated content format recognition parameters;
    Internet protocol content format recognition parameters;
    content memory storage rate characteristics;
    content memory retrieval rate characteristics; and
    client device content download rates.

6. A system for the retrieval of streaming video content, comprising:
    at least one cache, having a first capacity and depth, and receiving (i) at least a first stream of content conforming to a first format and (ii) at least a second stream of content conforming to a second format;
    at least one first memory configured to store instructions and parameter data associated with the first format and the second format;
    at least one second memory configured to store video content; and
    a controller configured to dynamically adjust the rate at which content data is retrieved from within the at least one second memory based, at least in part, upon one of the following parameters:
        the recognition of the stored content as conforming to the first format;
        the recognition of the stored content as conforming to the second format;
        the peak rate at which content can be written to the at least one cache;
        the sustained rate at which content can be written to the at least one cache;
        the peak rate at which content can be retrieved from the at least one cache;
        the sustained rate at which content can be retrieved from the at least one cache;
        the peak rate at which content can be retrieved from the at least one second memory;
        the sustained rate at which content can be retrieved from the at least one second memory; and
        the first capacity and depth.

7. The system of claim 6 wherein:
    the first format comprises quadrature amplitude modulated video data; and
    the second format comprises Internet protocol video data.

8. The system of claim 6 wherein the streaming video content is sourced from at least one of the following:
    an Internet-based content provider; and
    a multi-service provider.

9. The system of claim 6 wherein the at least one second memory comprises at least one of the following:
    a disc drive;
    a solid-state drive; and
    a cloud-based storage system.

10. The system of claim 6 wherein the stored instructions and parameter data comprises at least one of the following:
    quadrature amplitude modulated content format recognition parameters;
    Internet protocol content format recognition parameters;
    content memory storage rate characteristics;
    content memory retrieval rate characteristics; and
    client device content download rates.

11. A method for the storage of streaming video content, in a system comprising:
    a controller;
    at least one cache, having a first capacity and depth, and receiving (i) at least a first stream of content conforming to a first format and (ii) at least a second stream of content conforming to a second format;

at least one first memory adapted to store instructions and parameter data associated with the first format and the second format; and at least one second memory adapted for the storage of video content wherein the method comprises the step of:
dynamically adjusting, by the controller, the rate at which content data is stored within the at least one second memory based, at least in part, upon one of the following parameters:
the recognition of the stored content as conforming to the first format;
the recognition of the stored content as conforming to the second format;
the peak rate at which content can be written to the at least one cache;
the sustained rate at which content can be written to the at least one cache;
the peak rate at which content can be retrieved from the at least one cache;
the sustained rate at which content can be retrieved from the at least one cache;
the peak rate at which content can be stored in the at least one second memory;
the sustained rate at which content can be stored in the at least one second memory; and
the first capacity and depth.

12. The method of claim 11 wherein:
the first format comprises quadrature amplitude modulated video data; and
the second format comprises Internet protocol video data.

13. The method of claim 11 wherein the streaming video content is sourced from at least one of the following:
an Internet-based content provider; and
a multi-service provider.

14. The method of claim 11 wherein the at least one second memory comprises at least one of the following:
a disc drive;
a solid-state drive; and
a cloud-based storage system.

15. The method of claim 11 wherein the stored instructions and parameter data comprises at least one of the following:
quadrature amplitude modulated content format recognition parameters;
Internet protocol content format recognition parameters;
content memory storage rate characteristics;
content memory retrieval rate characteristics; and
client device content download rates.

16. A method for the retrieval of streaming video content, in a system comprising:
a controller at least one cache, having a first capacity and depth, and receiving (i) at least a first stream of content conforming to a first format and (ii) at least a second stream of content conforming to a second format;

at least one first memory configured to store instructions and parameter data associated with the first format and the second format; and at least one second memory configured to store video content wherein the method comprises the step of:
dynamically adjusting, by the controller, the rate at which content data is retrieved from within the at least one second memory based, at least in part, upon one of the following parameters:
the recognition of the stored content as conforming to the first format;
the recognition of the stored content as conforming to the second format;
the peak rate at which content can be written to the at least one cache;
the sustained rate at which content can be written to the at least one cache;
the peak rate at which content can be retrieved from the at least one cache;
the sustained rate at which content can be retrieved from the at least one cache;
the peak rate at which content can be retrieved from the at least one second memory;
the sustained rate at which content can be retrieved from the at least one second memory; and
the first capacity and depth.

17. The method of claim 16 wherein:
the first format comprises quadrature amplitude modulated video data; and
the second format comprises Internet protocol video data.

18. The method of claim 16 wherein the streaming video content is sourced from at least one of the following:
an Internet-based content provider; and
a multi-service provider.

19. The method of claim 16 wherein the at least one second memory comprises at least one of the following:
a disc drive;
a solid-state drive; and
a cloud-based storage system.

20. The method of claim 16 wherein the stored instructions and parameter data comprises at least one of the following:
quadrature amplitude modulated content format recognition parameters;
Internet protocol content format recognition parameters;
content memory storage rate characteristics;
content memory retrieval rate characteristics; and
client device content download rates.

* * * * *